Feb. 18, 1969  D. F. PUTNAM  3,428,535

PROCESS OF EXTRACTING POTABLE WATER FROM URINE

Filed May 24, 1965  Sheet 1 of 2

INVENTOR
DAVID F. PUTNAM
BY Norman Friedland
ATTORNEY

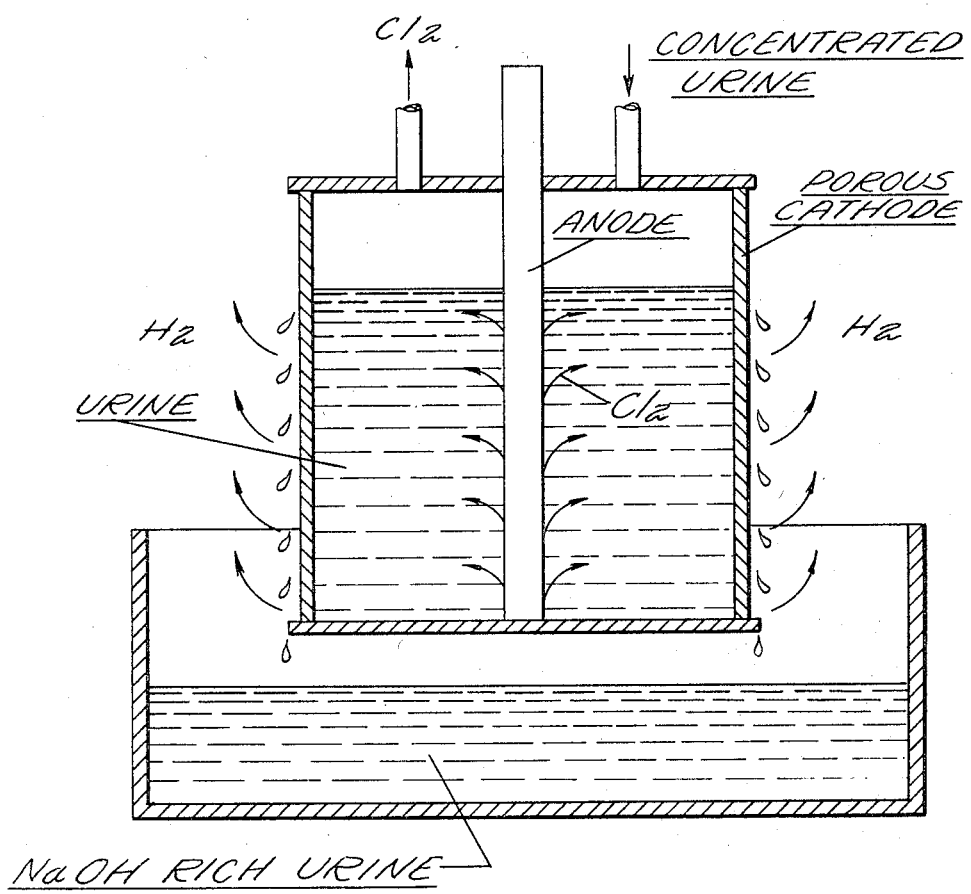

United States Patent Office 3,428,535
Patented Feb. 18, 1969

3,428,535
PROCESS OF EXTRACTING POTABLE WATER FROM URINE
David F. Putnam, Granville, Mass., assignor to United Aircraft Corporation, East Hartford, Conn., a corporation of Delaware
Filed May 24, 1965, Ser. No. 458,156
U.S. Cl. 204—149     7 Claims
Int. Cl. C02c 5/12; C02b 1/04

This invention relates in general to the distillation of potable water from human urine and more particularly to a pretreatment technique in a urine distillation process whereby the potable water may be extracted without the use of expendable chemicals. It contemplates the generation of the necessary pretreatment chemicals from the urine itself by the electrolytical decomposition of the sodium chloride therein.

In closed circuit survival systems such as in space vehicles, the cost of reclaiming water from urine is calculated in terms of equivalent weight. One important element of the total equivalent weight is the amount of expendable material entering into the treatment process, i.e., the chemicals consumed in the pretreatment. Although the weight penalty associated with the stored water requirement may not be severe for a short term space mission, the advantage of water reclamation in long duration missions or heavily manned space stations is evident. Further, in the same circumstances the weight penalty associated with the storage of urine pretreatment chemicals may similarly be disadvantageous.

It is an object of this invention to provide a method of extracting potable water from urine without the use of expendable chemicals.

A further object of this invention is to provide a pretreatment for urine wherein ammonia carry-over into the product is eliminated by fixing the ammonia with chlorine to form a stable ammonium salt which will exhibit little thermal decomposition at the preferred distillation temperatures.

A further object is to provide means for generating chlorine from urine and subsequently utilizing this chlorine in the fixation of ammonia and in the sterilization of the distillate to reduce the bacterial level therein.

These and other objects of this invention will be described in detail in the following description or will be evident from the description or practice of this invention.

FIGURE 3 is a somewhat schematic sectional view of my preferred chlorine generation cell.

Although more than 140 different substances have been discovered in human urine, 70% of the total weight of these materials is accounted for by just two components, urea ($H_2NCONH_2$) and sodium chloride, the sodium chloride comprising about 20% by weight of the total amount. It is possible by one mechanism or another for all of these materials to appear as contaminants in the urine distillate; however, the most common contaminant in product, if no preventive action is taken in the distillation system, is free ammonia. Free ammonia is that ammonia which is liberated from the decomposition of ammonium carbonate and/or ammonium bicarbonate when urine is vaporized, viz:

(1)     $(NH_4)_2CO_3 \rightarrow 2NH_3 + CO_2 + H_2O$ (2)     $NH_4HCO_3 \rightarrow NH_3 + CO_1 + H_2O$

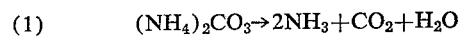

If no preventive action is taken, this free ammonia is transported together with liberated carbon dioxide and water vapor from the system's evaporator to its condenser. In the condenser most of the ammonia dissolves in the condensate to produce an unacceptable drinking water.

This ammonia proble can be solved by sorbing the ammonia in a suitable bed, but a more efficient approach is to prevent its evolution by chemically fixing it prior to distillation. There are many chemical compounds which react with ammonium carbonate to form stable ammonium salts; however, chlorine is attractive from a weight point of view. It is further attractive because it can be generated from urine in sufficient quantity to effect an adequate pretreatment in the following manner:

(3)     $Cl_2 + H_2O \rightarrow HCl + HOCl$ (4)     $2(NH_4)_2CO_3 + 2HCl + 2HOCl \rightarrow 4NH_4Cl + 2H_2O + 2CO_2 + O_2$

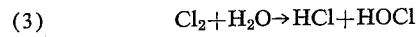
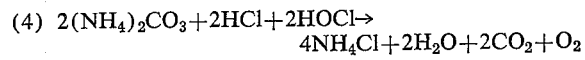

One mole of chlorine gas dissolves in water to produce one mole of hydrochloric and one of hypochlorous acid. The hypochlorous acid is an active oxidizer which readily reacts with the organic constituents in urine, producing in the process another mole of hydrochloric acid.

The feasibility of generating chlorine from urine has been established. By passage of an electric current, some of the sodium chloride and water will decompose as follows:

(5)     $2NaCl + 2H_2O \rightarrow Cl_2 + H_2 + 2NaOH$

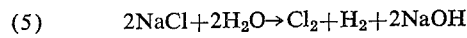

The chlorine thus liberated is then utilized to pretreat the urine and fix the ammonia as previously discussed.

Further, it is necessary to limit the number of coliform and other bacteria present in the distillate. Among the techniques for controlling bacteria are chemical additives including the heavy metal ions, ozone, chlorine, and hypochlorites as well as temperature control including pasteurization and freezing. All of these techniques are well known and are described in detail in the literature. The chlorine generated from the urine in the electrolytical process above described may be used for this purpose with no expendable weight penalty.

Figure 1:
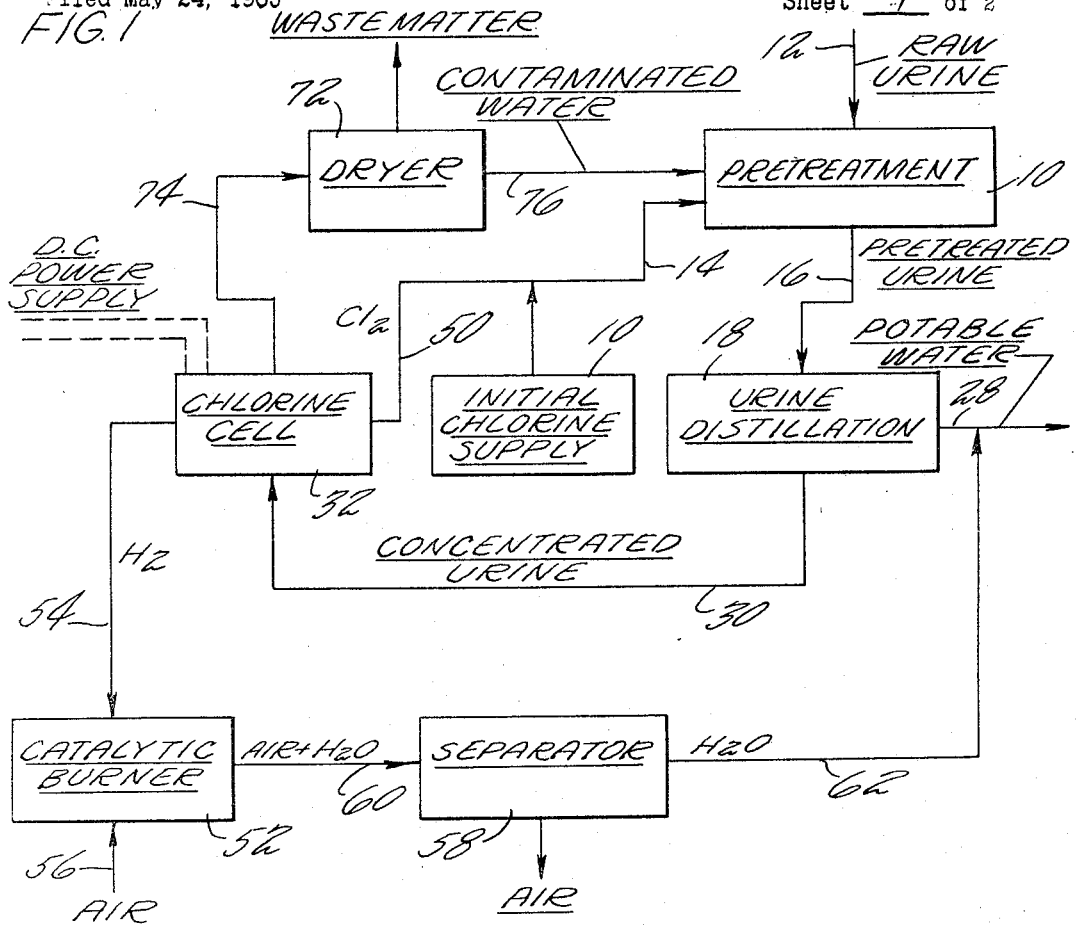
FIGURE 1 is a schematic of a typical urine reclamation system incorporating the chlorine cell and urine pretreatment step comprising my invention.

A schematic of a typical urine distillation process incorporating my chlorine pretreatment step is illustrated in FIGURE 1. In this process the raw urine is introduced into the pretreatment tank 10 through inlet pipe 12. Within the pretreatment tank 10, chlorine admitted through line 14 is reacted with the raw urine to form a stable ammonium chloride salt according to Equations 3 and 4. The released carbon dioxide remains dissolved in the solution until a subsequent evaporation increases its concentration beyond the saturation point, at which point it begins to outgas. The pretreated urine is withdrawn from tank 10 and fed through line 16 to the urine distillation unit 18 wherein potable water is extracted in a distillation process.

Figure 2:
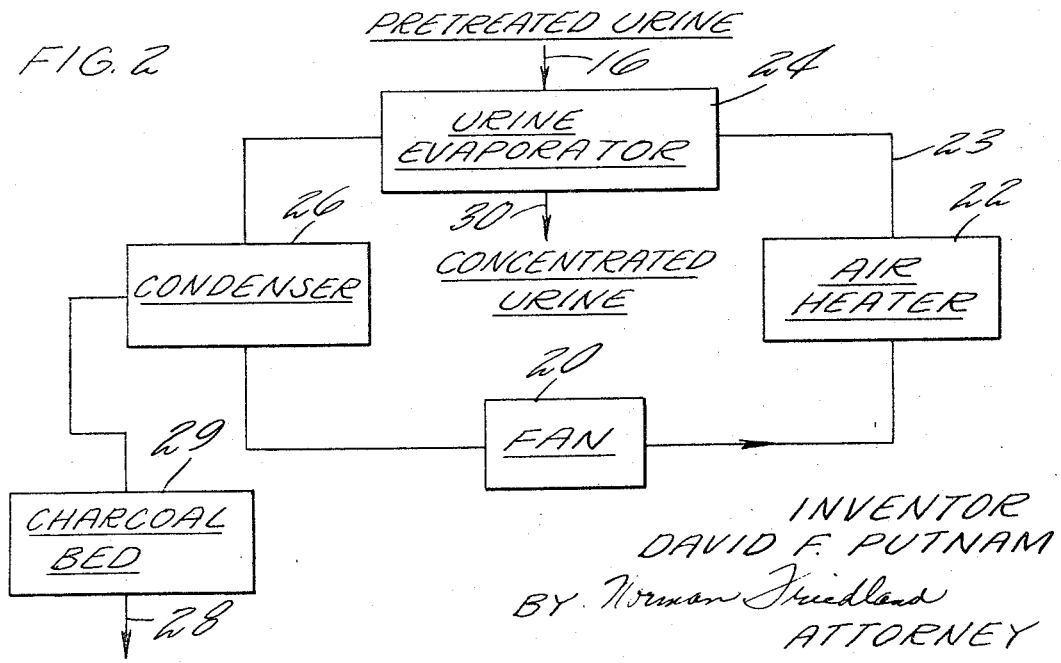
FIGURE 2 is a schematic of a typical urine distillation cycle.

While many distillation methods are contemplated and are well known in the art, I prefer the method illustrated schematically in FIGURE 2. In this method, the recycled air driven by fan 20 and heated in air heater 22 is circulated in a closed loop 23 to and through a urine evaporator 24. The warm air at 100–180° F. absorbs water from the urine in the evaporator and leaves in a highly humid condition. It passes to the condenser 26 wherein the water absorbed in the evaporator is removed by cooling the air stream, the potable water being discharged from the condenser through line 28, preferably through a bed of activated charcoal 29 wherein the residual malodorous contaminants are removed in the well known manner.

In a typical evaporator core, the heated air is forced lengthwise through a plurality of porous foam spacers positioned between slabs of viscose rayon felt which act as wicks. The urine flows to the surface of the wicks by capillary action and into contact with the foam spacers wherein the water is evaporated and carried to the condenser by the flowing air.

A substantial portion of the water in the pretreated urine is thus removed in the distillation unit 18, the remaining urine thereby becoming concentrated. The concentrated urine is removed from the evaporator 24 through line 30 and fed to the chlorine cell 32. The construction of a chlorine cell which I have found to be particularly advantageous is illustrated in FIGURE 3. It comprises a cylindrical porous nickel cathode 34 separated from a graphite anode 36 by dielectric spacers 38 and 40. The porous cathode 34 and the dielectric spacers 38 and 40 define a containment tank to which the concentrated urine is fed through conduit 30. When a direct current is applied to the cell, chlorine in liberated at the anode and hydrogen at the cathode in accordance with Equation 5.

The liberated chlorine is collected as needed and conducted to the pretreatment tank 10 through conduit 50, the generated hydrogen being fed to the catalytic burner 52 through conduit 54 wherein it is reacted with air fed to the burner through pipe 56. additional water being formed in the process. The humid air is then transmitted from the burner through line 60 to the separator 58 wherein the additional water is removed, this water being added to the potable water supply through conduit 62.

The catalytic burner 52 utilized may be one of the many burners well known in the art. In general, these burners uitilze an oxidation-promoting catalyst, such as rhodium-alumina, to facilitate the oxidation process whereby the hydrogen is converted to water vapor. Similarly, the separator 58 may incorporate any of the well known techniques for separating water from air, including adsorption, condensation or centrifugal separation.

As is most clearly seen in FIGURE 3, a sodium hydroxide rich urine is produced as a result of the reaction within the chlorine cell, this hydroxide rich urine passing through the porous cathode to the collection means 70. This urine contains about 5 percent of the water present in the raw urine. It is, therefore, passed to a dryer 72 through pipe 74 wherein this water is extracted. An evaporation cycle similar to that utilized in the distillation step may be used for this purpose, although other means are contemplated. In the usual system, this water would not be potable without further processing and, therefore, it is shown as being fed through line 76 to the pretreatment tank for reprocessing along with raw urine.

With such a system, an initial supply of chlorine is needed to produce the first batch of concentrated urine after which the system is self-sustaining. Such a chlorine supply is indicated in FIGURE 1 at 90.

The urine reclamation process described may be run either as a continuous process or as a batch process, although in a practical sense it would normally be run periodically treating urine in batches. Although theoretically, the power requirements of the chlorine cell should be somewhat lower, it was found that about one watt-hour was required for each pound of urine treated in the chlorine cell. Power was typically delivered to the chlorine cell electrodes at 3 or 4 volts D.C. at a current of ½–2 amperes.

It will be understood, although it has not been shown, that, depending on the system configuration, it may be necesary to provide pumping means between the various stages of the process and for this purpose any suitable equipment may be utilized. Further, in some stages of the processing flow cycle, sufficient motive power to transfer fluids between tanks may be provided by a pressure differential or by gravity.

While I have illustrated and described a preferred embodiment of my invention, it will be understood that numerous modifications may be made thereto within the scope of the appended claims without departing from the spirit of the invention.

I claim:
1. In the process of extracting potable water from urine, the improvement which comprises:
   electrolytically decomposing the sodium chloride in the urine to liberate chlorine,
   collecting the chlorine thus liberated, and
   pretreating the raw urine with the collected chlorine to fix the ammonia therein.
2. The method of claim 1 wherein:
   the liberated chlorine is collected by absorption in a liquid, and
   the raw urine in pretreated with said liquid to form a thermally stable ammonium salt.
3. The method of extracting potable water from urine without the use of expendable chemicals comprising the steps of:
   electrolytically generating chlorine from the urine,
   pretreating the raw urine with the generated chlorine to form a thermally stable annonium salt, and
   extracting the potable water from the pretreated urine by distillation.
4. The method of claim 3 wherein the distillation is effected at a temperature below the thermal decomposition temperature of ammonium chloride.
5. The method of claim 3 wherein the distillation is effected at a urine temperature of 50–150°F.
6. The method of claim 5 wherein the amount of chlorine utilized in the raw urine pretreatment is sufficient to fix the free ammonia in the urine and to sterilize the urine with respect to bacterial growth.
7. In the process of extracting potable water from urine by distillation, the improvement which comprises:
   electrolytically generating chlorine from the urine,
   collecting the chlorine thus generated, and
   sterilizing the potable water distillate with the collected chlorine.

References Cited
UNITED STATES PATENTS

| | | | |
|---|---|---|---|
| 3,242,058 | 3/1966 | Ganley et al. | 203—1 |
| 3,262,869 | 6/1966 | Belasco et al. | 204—101 |
| 3,276,848 | 10/1966 | Bair et al. | 203—11 |

JOHN H. MACK, *Primary Examiner.*

H. M. FLOURNOY, *Assistant Examiner.*

U.S. Cl. X.R.

204—128